United States Patent
Burgard et al.

[11] Patent Number: 5,935,275
[45] Date of Patent: Aug. 10, 1999

[54] PROCESS FOR PRODUCING WEAKLY AGGLOMERATED NANOSCALAR PARTICLES

[75] Inventors: Detlef Burgard, Völklingen; Rüdiger Nass, Riegelsberg; Helmut Schmidt, Saarbrücken-Güdingen, all of Germany

[73] Assignee: Institut Für Neue Materialien gemeinnützige GmbH, Saarbrücken, Germany

[21] Appl. No.: 08/945,411

[22] PCT Filed: Apr. 26, 1996

[86] PCT No.: PCT/EP96/01756

§ 371 Date: Oct. 29, 1997

§ 102(e) Date: Oct. 29, 1997

[87] PCT Pub. No.: WO96/34829

PCT Pub. Date: Nov. 7, 1996

[30] Foreign Application Priority Data

Apr. 29, 1995 [DE] Germany ............ 195 15 820

[51] Int. Cl.⁶ ............... B05D 7/00; B01D 9/00
[52] U.S. Cl. ............ 23/295 R; 23/293 R; 423/593; 423/263; 427/220; 428/403
[58] Field of Search .................. 423/263, 593, 423/295 R; 23/293 R, 300; 428/403; 427/220

[56] References Cited

U.S. PATENT DOCUMENTS 5,593,781  1/1997  Nass et al. .................. 423/593

FOREIGN PATENT DOCUMENTS 0253552  1/1988  European Pat. Off. .
2168834  6/1986  United Kingdom .
93-21127  10/1993  WIPO .

OTHER PUBLICATIONS

Charty et al. The Role of Complexing Ligands in the Formation of Non Aggregated Nanoparticles of Zirconia Journal of Sol–Gel Science & Technology 1(1994) #3 Dordrecht NL.

Lerot et al, Chemical Control in Precipitation of Spherical Zirconia Particles, J. Material Science 26(1991) May 1, #9 London GB.

*Primary Examiner*—Gary P. Straub
*Attorney, Agent, or Firm*—Oblon, Spivak, McClelland, Maier & Neustadt, P.C.

[57] ABSTRACT

A description is given of a process for producing weakly agglomerated, densified and/or crystallized nanosize particles which is characterized in that either (a) a suspension containing amorphous or partially crystalline nanosize particles is produced in a conventional manner from precursors for the nanosize particles, where the nanosize particles are produced in a solvent which has no solvent capability, or only a low solvent capability, for the particles and in the presence of at least one surface-blocking substance, or (b) an already formed powder comprising amorphous or partially crystalline nanosize particles is suspended in the solvent specified under (a) in the presence of the surface-blocking substance or substances specified under (a), or (c) a sol containing amorphous or partially crystalline nanosize particles is suspended in the solvent specified under (a) in the presence of the surface-blocking substance or substances specified under (a); and the suspension thus produced is subjected to conditions which lead to a densification and/or crystallization of the nanosize particles.

15 Claims, No Drawings

PROCESS FOR PRODUCING WEAKLY AGGLOMERATED NANOSCALAR PARTICLES

TITLE OF THE INVENTION

The present invention relates to a process for producing weakly agglomerated, densified and/or crystallized nanosize particles.

DESCRIPTION OF THE BACKGROUND

Processes for producing powders having primary particle sizes below 100 nm (nanosize powders) have attracted increasing interest in recent years since these powders have the potential to enable completely new materials, for example ceramics or composites, based on them to be developed. As in the case of the submicron powders (particle diameters of from 0.1 to 1 $\mu$m) already available, high demands in terms of quality are also made of nanosize powders but these demands are different depending on material and application. For ceramic powders, important criteria are, for example:

high chemical purity phase stability powder density crystallinity particle size distribution and particle morphology specific surface area state of agglomeration.

The last point in particular is of great importance for the use of nanosize powders in powder metallurgical processing and manufacturing processes. In general, the powder particles should have a density which is as high as possible and/or possess crystalline structures. The agglomerates which are inevitably present should have a nature such that they can be broken up again to their primary particle size during processing. The potential of nanosize powders can be optimally utilized only subject to these prerequisites. This means that soft agglomerates are required. Particles which allow the state of agglomeration between nanosize particles to be adjusted are therefore necessary. This can be carried out during the synthesis or in a downstream process.

Physical and chemical processes for producing nanosize (ceramic) powders are described in the literature. The physical processes are divided into three categories, namely vacuum, gas-phase and condensed-phase syntheses. However, their applicability is restricted by the low material conversion to the production of small amounts of powder.

Processes which include chemical reactions are becoming increasingly important in the powder synthesis, for example hydrothermal synthesis, precipitation reactions, flame hydrolysis, plasma synthesis, the sol-gel process or emulsion processes.

In the hydrothermal synthesis, inorganic salts are converted by means of precipitation reactions under increased pressure and elevated temperatures (above the critical data of the solvent) into the corresponding oxide, hydrated oxide or hydroxide. Setting the optimum reaction parameters (pH, type and concentration of the starting compounds, pressure, temperature) enables crystallite sizes of about 20 nm to be achieved. However, a disadvantage in this process is the formation of agglomerates which can no longer be broken up. These agglomerates are formed as a result of metal-OH groups present on the particle surface undergoing condensation reactions during drying and calcination of the powder. Since agglomerate formation is generally not reversible the potential of this technique can at present be utilized only to a restricted extent.

Flame hydrolysis is a standard method of producing aerosils. It gives high powder yields and can be applied to many materials. In this process, volatile compounds such as $SiCl_4$, $TiCl_4$ or $ZrCl_4$ are reacted in a hydrogen/oxygen flame to give very fine oxide particles. Although oxide powders having particle sizes of from 5 to 50 nm can be produced by means of flame hydrolysis, a disadvantage of this process is the great degree of agglomerate formation, since the cohesion between the particles increases greatly with decreasing particle size. Redispersion of these powders to their primary particle size is usually possible to only a small extent, if at all.

Plasma synthesis enables not only oxidic powders but also nitrides and carbides to be produced. In this process, for example, metal powders or suitable metal compounds are vaporized in an inductively coupled plasma and reacted with ammonia to produce nitrides or with methane to produce carbides. This process enables highly pure, very fine spherical powders to be produced and, when the reaction parameters are optimally set, it gives particles having diameters of about 5 nm which, although they are agglomerated, have only few solid bridges between the particles. However, this is a technically very complicated process which is associated with a high outlay in terms of apparatus.

A further process is the sol-gel process. In this method, suitable starting compounds such as reactive metal alkoxides are hydrolyzed and condensed in a solvent to form a sol (soluble oligomers or polymers or colloidal suspension). Further reaction forms a gel (solid) which can be converted by thermal after-treatment into a crystalline powder. Adjustment of particular parameters makes it possible to control the reaction in such a way that sols having particle sizes far below 50 nm can be produced. A disadvantage of this process is the formation of amorphous materials which have to be converted into a crystalline product by means of a thermal after-treatment. Owing to the high density of OH groups on the particle surface, condensation reactions result in neck formation between the particles (aggregation=hard agglomerates) which makes it impossible to break the powders down to the primary particle size during processing.

A relatively new route to the precipitation of very fine ceramic powders is the emulsion technique. In this method, an aqueous phase in the form of very fine droplets is dispersed in a liquid which is not miscible with water. Both the droplet size and the stability of the emulsions are dependent on many factors which, however, have only begun to be studied for powder syntheses.

A prerequisite for the formation of powders using the emulsion technique is that the dispersed aqueous phase can be converted into a solid phase by suitable chemical reactions such as precipitation or condensation reactions. An important role in the formation of an emulsion is played by surface-active substances (emulsifiers) with whose help a salt solution can be emulsified to form very fine droplets in a hydrocarbon. The water droplets emulsified in this way can be regarded as submicroscopic minireactors which have the same properties as macroscopic solutions. The metal hydroxides or oxides can be precipitated by increasing the pH. This is achieved, for example, by passing ammonia gas into the emulsion or by the addition of organic bases which have to be soluble in the dispersion medium. To convert the liquid phase into a solid phase, the water is removed by azeotropic distillation. The particles formed are thereby densified. Agglomeration of the particles is largely prevented by the presence of the emulsifiers which shield the reactive surfaces.

Although high-quality nanosize powders can be produced via emulsions, the volume yield is frequently low in such emulsion processes, so that these processes are not exploited industrially for powder production. A decisive reason for the low volume yield in emulsion processes is that emulsions always involve two-phase systems but the precursors are introduced only via one phase.

As shown above, there are many synthetic variants for very fine powders. However, an unsolved problem is control of agglomeration, particularly in the densification and/or crystallization of nanosize particles (diameter 1–100 nm).

SUMMARY OF THE INVENTION

It is therefore an object of the present invention to provide nanosize, weakly agglomerated powders having a high particle density and/or crystalline structure.

According to the invention, this object is achieved by a process for producing weakly agglomerated, densified and/or crystallized nanosize particles in which either (a) a suspension containing amorphous or partially crystalline nanosize particles is produced in a conventional manner from precursors for the nanosize particles, where the nanosize particles are produced in a solvent which has no solvent capability, or only a low solvent capability, for the particles and in the presence of at least one surface-blocking substance, or (b) an already formed powder comprising amorphous or partially crystalline nanosize particles is suspended in the solvent specified under (a) in the presence of the surface-blocking substance or substances specified under (a), or (c) a sol containing amorphous or partially crystalline nanosize particles is suspended in the solvent specified under (a) in the presence of the surface-blocking substance or substances specified under (a); and the suspension thus produced is subjected to conditions which lead to a densification and/or crystallization of the nanosize particles.

DETAILED DESCRIPTION OF THE INVENTION

The nanosize particles are preferably oxide or hydrated oxide, sulphide, selenide, telluride and/or phosphide particles, particularly preferably (hydrated) oxide particles.

The (hydrated) oxides are preferably those which are suitable for producing glass or ceramic. In particular, they are selected from among (hydrated) oxides of main group and transition metals such as Mg, Ca, Sr, Ba, Al, Si, Sn, Pb, Bi, Ti, Zr, V, Mn, Nb, Ta, Cr, Mo, W, Fe, Co, Ru, Cu, Zn, Ce and Y. Particular preference is given to those of Ba, Al, Ti, Zr, Fe, Y, Sc, Ru, Zn and Pb.

Preferred examples of oxides of these elements are $Al_2O_3$, $Fe_2O_3$, $ZrO_2$, $TiO_2$, $Y_2O_3$, $Y_2O_3/ZrO_2$, $Pb(ZrTi)O_3$ (PZT), $BaTiO_3$, $BaRuO_3$, $ZnO$ and $Sc_2O_3/ZrO_2$.

In the above variant (a), at least one (hydrated) oxide is precipitated in the presence of a surface-blocking substance by changing the pH of and/or by addition of water to a solution or a sol which contains at least one element which can be precipitated as (hydrated) oxide.

The solution or the sol which contains the element or elements which can be precipitated as (hydrated) oxide can be either aqueous or nonaqueous (organic). As nonaqueous solvents, preference is given to those which are readily miscible with water, for example monohydric and polyhydric alcohols such as methanol, ethanol, n- and i-propanol, ethylene glycol, propylene glycol, diethylene glycol and glycerol, ketones such as acetone and butanone, esters such as ethyl acetate, amides such as dimethylformamide and dimethylacetamide and sulphoxides such as dimethyl sulphoxide. Particularly preferred organic solvents for use in this variant are aliphatic alcohols, in particular those having from 1 to 3 carbon atoms.

If the starting solution used is an aqueous solution, this contains, in dissolved form, at least one element which can be precipitated as (hydrated) oxide by changing the pH. Nonaqueous solutions can also contain dissolved elements which can be precipitated without changing the pH (e.g. merely by addition of water).

In aqueous starting solutions, the element which can be precipitated as (hydrated) oxide is preferably present in the form of a hydrolyzable salt, in nonaqueous solutions it is preferably present as a hydrolyzable organometallic compound. In all cases, an upper limit to the concentration is imposed by the solubility of the respective compound in the solvent used. At the lower end, the concentration should, for economic reasons, be not less than 10% by weight (based on the hydrolyzable compound used).

When salt solutions are employed, preference is given to using those salts which have counter ions which can be easily removed or decomposed thermally. Particularly suitable salts are therefore nitrates or salts of carboxylic acids (e.g. formates, acetates and propionates) and also ammonium salts.

Apart from such simple salt solutions, it is also possible to use aqueous sols which can be prepared, for example, by hydrolyzing a metal alkoxide which is dissolved in, for example, a short-chain alcohol (e.g. a $C_1$–$C_3$-alcohol) by addition of water. However, commercially available sols such as water glass can also be used. These sols can also serve as starting materials for the above variant (c). Suitable solvents for preparing the suspensions as described in variants (a) to (c) are generally all those which do not dissolve, or dissolve only to a negligible degree, the particles which are to be formed or are already present. This property depends, of course, on the nature of the particles concerned. In general, specific examples of solvents which can be used are water, alcohols, glycols, amines, amides, aliphatic, cycloaliphatic and aromatic hydrocarbons which may, if desired, be substituted, in particular halogenated (preferably chlorinated), and suitable mixtures of these solvents. Of course, it is also possible, particularly in the above variant (a), to completely or partially replace the solvent after the in situ generation of the nanosize particles by a solvent which is more favourable for the densification and/or crystallization (e.g. by vaporization and addition of the new solvent). This can be advantageous, in particular, when the suspension is to be subjected to elevated temperatures and possibly increased pressures below the critical data of the solvent, as is described in more detail below.

Surface-blocking substances which can be used are all compounds which can form a chemical bond or enter into a strong interaction with the surface of the particles. Examples of chemically bonded surface blockers are the conventional complexing agents such as (poly)carboxylic acids, polyamines, in particular diamines, β-dicarbonyl compounds such as β-diketones and β-carbonylcarboxylic acids and also amino acids. Other examples of surface-blocking substances are long-chain alcohols (preferably having from 8 to 30 and in particular from 8 to 15 carbon atoms), cellulose derivatives and nonionic surfactants. Nonionic surfactants, if desired in combination with other surface-blocking substances, are preferred according to the invention as surface-blocking substances, particularly in variant (a).

Specific examples of nonionic surfactants which can be used according to the invention are sorbitan esters of fatty acids (for example those marketed under the trademark Span®), polyethylene oxide derivatives of these sorbitan esters (for example those marketed under the trademark Tween®), fatty acid polyglycol esters (for example those from the Emulsogen® series) and also surfactants which are available on the market under the trademarks Brij®, Arlacel®, Emulan® and Marlovet®, etc. However, this listing represents only a small selection of the nonionic surfactants which can be used according to the invention.

It is possible, however, to use more than one surface-blocking substance in the process of the invention, e.g. a mixture of at least two nonionic surfactants. Furthermore, it is possible, for example, to use a mixture of one or more nonionic surfactants together with at least one relatively long-chain aliphatic alcohol (preferably having from 8 to 15 carbon atoms, e.g. octanol, decanol, undecanol, dodecanol, tridecanol and pentadecanol). Particular preference is given to using a mixture of two nonionic surfactants or a mixture of one surfactant and one relatively long-chain aliphatic alcohol. When using surfactant mixtures, it has been found to be beneficial to use those surfactants which have, particularly in their hydrophobic parts, identical or similar structural features, for example the pair Tween®80/Emulsogen® OG, in which the hydrophobic part is in both cases derived from an oleic acid unit.

The total concentration of the surface-blocking substances used in the process of the invention is preferably from 2 to 30% by weight, in particular from 2 to 20% by weight and particularly preferably from 5 to 10% by weight, based on the solid to be formed or already present.

The surface-blocking substances used according to the invention are to modify and passivate the surface of the particles formed during the precipitation. Without wishing to be tied to a particular theory, it is assumed that the surface-blocking substances interact with the particle surfaces and thus effect a thermodynamic stabilization of the surface. The free reaction enthalpy of the interaction compensates for the decrease in the free surface enthalpy which takes place as a result of particle growth. This suppresses uncontrolled particle growth and gives particles having a very uniform particle size distribution. Furthermore, this surface modification stabilizes the particles by formation of a spherical barrier against agglomeration. This can also have a positive effect during calcination of the isolated particles in the furnace, since many of the surface-blocking substances which can be used decompose completely only at temperatures above 400° C. and at these temperatures the deactivation of the particle surfaces by elimination of $H_2O$ has already progressed substantially, which can prevent or at least minimize agglomeration of the particles. If the crystallization and/or densification of the particles is carried out directly in the suspension at elevated temperatures and pressures below the critical data of the solvent, it has been found that crystalline particles can be obtained without agglomerates since the surface-modifying layer around the particles is completely retained.

The change in the pH which may be required in variant (a) of the process of the invention, particularly in the case of (hydrated) oxides, or the setting of the pH necessary for precipitation can in principle be achieved by use of any basic or acidic compound which is soluble in the respective solvent. Preference is given to using compounds which can easily be removed again by thermal treatment of the particles formed, if desired. Suitable compounds for increasing the pH are therefore, for example, ammonia (as solution or gaseous) or organic bases such as amines or quaternary ammonium salts, while suitable compounds for lowering the pH are, in particular $HNO_3$ and short-chain carboxylic acids (preferably having 1–3 carbon atoms, e.g. formic, acetic or propionic acid).

In the production of nanosize particles from salt solutions or sols, a particularly preferred method of changing the pH is the use of acidic or basic (organic or inorganic) ion-exchange resins. In this case, a change in the pH is achieved by replacement of the counterions of the elements to be precipitated present in the salt solution with $H^+$ or $OH^-$ respectively, by means of the ion-exchange resins. This method has the advantage that after the precipitation no foreign salts which have to be removed are present in the suspension containing the nanosize particles. In practice, such an exchange can be carried out, for example, by passing the salt solution (or the sol) to be precipitated in which the appropriate surface-blocking substance is also dissolved through an ion exchange column, with the residence time of the solution in the column being such that the exchange and the precipitation are essentially complete. Another possibility is to stir the appropriate salt solution (or the sol) with an approximately stoichiometric amount of ion-exchange resin and to separate it off after exchange is complete. According to the invention, it is possible to use all commercially available ion-exchange resins, but organic resins are preferred.

The actual precipitation reaction can be carried out in many ways, depending on, inter alia, whether the precipitation is to be achieved by a change in pH or by addition of water.

However, two variants are particularly preferred for the precipitation. In the first variant, at least one acidic or basic substance and/or water is/are added to the solution or the sol which contains, for example, the element or elements which can be precipitated as (hydrated) oxide and the surface-blocking substance or substances (dissolved or emulsified).

In the second particularly preferred variant, the solution or the sol which contains the element or elements which can be precipitated as (hydrated) oxide is added (e.g. dropwise) to an aqueous solution which has a pH suitable for the precipitation and contains at least one surface-blocking substance.

After the suspension of nanosize particles has been prepared by one of the above variants (a) to (c), it is, according to the invention, subjected to conditions which lead to densification and/or crystallization of the nanosize particles.

For this purpose, the suspension is preferably exposed (preferably for a plurality of hours, e.g. from 1 to 24 hours) to an elevated temperature and, if appropriate, an increased pressure. This treatment is particularly preferably carried out at below the critical data of the solvent present. Of course, the elevated temperatures also have to ensure that the surface-blocking substance and the solvent do not decompose or decompose only insignificantly.

Here, elevated temperature is, in particular, a temperature from about 150 to 350° C. and increased pressure is a pressure of from about 10 to 100 bar. For example, the suspension which contains the nanosize particles and has been prepared as described in variants (a) to (c) is, preferably without further pretreatment, placed in a pressure vessel and treated at an appropriate pressure and appropriate temperature. The parameters (pressure, temperature, treatment time) necessary for densification or crystallization of the respective particles can be easily determined by appropriate trials.

The densified or crystallized particles can be isolated from the suspension produced by the process of the invention by removal of the liquid phase or the solvent (e.g. by filtration and/or distillation). They can subsequently be dried (preferably at elevated temperatures), and, if desired, calcined.

It is also possible to subject the densified and/or crystallized particles obtained according to the invention to other processes customary in this field before drying or before calcination. For example, the surface-blocking substance can be removed from the surface of the particles and, if desired, replaced by a surface-modifying substance.

To remove the surface-blocking substance, the particles can be subjected to, for example, washing, a chemical reaction for the purpose of destroying the surface-modifying substance and/or dialysis.

The surface-modification of nanosize particles (for example using carboxylic acids, amines, etc.) has already been described extensively in the literature and does not have to be explained further here.

The process of the invention makes it possible to obtain nanocrystalline, weakly agglomerated, densified and/or crystallized particles (the sizes usually ranging from 5 to 20 nm).

The nanosize powders which are obtainable according to the invention can be further processed in a customary manner, for example by converting them into shaped bodies or layers by pressing or other shaping methods ((pressure) slip casting, extrusion, screen printing, tape casting, etc.) with subsequent sintering or preferably processing them into sheets having a thickness of preferably $\leq 20$ $\mu$m by casting. The powders produced according to the invention have a very high sinter activity owing to their small particle size and their good dispersibility.

The following examples illustrate the present invention without restricting its scope.

EXAMPLE 1

A mixture of 12.4 g of $Y(NO_3)_3 \cdot 4 H_2O$ and 255 g of zirconium n-propoxide was dissolved in 64 ml of ethanol. The resulting solution was added dropwise while stirring to 320 ml of an aqueous, ammoniacal solution (pH=12) which contained 2.1 g each of Emulsogen®OG and Tween®80. After addition was complete, the suspension formed was after-treated for 3 hours at 250° C. and 70 bar in a stirring autoclave. The solvent was subsequently distilled off. This enabled nanocrystalline, agglomerate-free particles (cubic $ZrO_2$ stabilized with 8 mol. % of Y and having an average size of 7 nm) to be obtained.

EXAMPLE 2

A solution of 25 g of $Al(NO_3)_3$ in 200 ml of $H_2O$ was added dropwise at 80° C. while stirring to an aqueous, ammoniacal solution containing 0.21 g each of Tween®80 and octanol. After addition was complete, the suspension formed was aged at 80° C. for 24 hours. The solvent was subsequently distilled off and the powder thus obtained was calcined at 1050° C. for 5 minutes. This gave nanocrystalline, redispersible $\alpha$-$Al_2O_3$ having particle sizes of from 40 to 60 nm.

EXAMPLE 3

55 g of a solution of 70% zirconium n-propoxide in propanol (Fluka) were dissolved in 400 ml of ethanol, after which a mixture of 11 ml of $HNO_3$ (65% by weight) and 12.5 ml of water was added dropwise. The solvent was then removed at 50° C. and 200 mbar. Addition of 237 ml of water in which 2 g of $Y(NO_3)_3$ had been dissolved gave a sol which contained 10% by weight of Zr salt. The concentration of Y salt was about 5 mol. %, based on Zr.

The sol obtained in this way was admixed with 0.5 g each of Emulsogen®OG and Tween®80. The pH was increased by passing ammonia gas into the sol and the solid was precipitated. The suspension was subsequently subjected to hydrothermal after-treatment for 3 hours at 250° C. and 70 bar in a stirring autoclave. Distilling off the solvent gave nanocrystalline, redispersible 5-Y-$ZrO_2$ having particle sizes of from 5 to 10 nm.

EXAMPLE 4

A solution of 150 g of 70% zirconium n-propoxide in propanol (Fluka) and 7.3 g of $Sc(NO_3)_3 \cdot 6 H_2O$ were dissolved in 400 g of ethanol. This solution was added dropwise while stirring to 500 ml of a solution of 5 g each of Emulsogen®OG and Tween®80 (pH=12). After addition was complete, the suspension formed in this way was subjected to treatment at increased pressure and elevated temperature (250° C., 65 bar, 3 h) in a stirring autoclave. Distilling of the solvent gave cubic, redispersible 8-Sc-$ZrO_2$ having particle sizes of from 5 to 10 nm.

We claim:

1. In a process for producing weakly agglomerated, densified and/or crystallized nanosize particles, comprising forming either (a) a suspension containing amorphous or partially crystalline nanosize particles, a liquid which has no solvent capability or only a low solvent capability for the particles, and at least one surface-blocking substance, by producing the nanosize particles from nanosize particle precursors in the liquid containing the surface-blocking substance;

(b) a suspension containing a powder comprising amorphous or partially crystalline nanosize particles, a liquid which has no solvent capability or only a low solvent capability for the particles, and at least one surface-blocking substance, by suspending the particles in the liquid which contains the surface-blocking substance; or (c) a sol containing amorphous or partially crystalline nanosize particles suspended in a liquid which has no solvent capability or only a low solvent capability for the particles, and at least one surface-blocking substance;

the improvement comprising treating the suspension (a) or (b) or the sol (c) at a temperature of 150 to 350° C. and at a pressure of 10 to 100 bar in the presence of said liquid and surface-blocking substance.

2. The process of claim 1, wherein the nanosize particles are oxide or hydrated oxide, sulphide, selenide, telluride and/or phosphide particles.

3. The process of claim 2, wherein the oxide or hydrated oxide particles are oxides or hydrated oxides of elements which are suitable for producing glass and/or ceramic.

4. The process of claim 3, wherein the elements which are suitable for producing glass and/or ceramic are selected from the group consisting of main group metals and transition metals.

5. The process of claim 1, wherein in (a) a suspension containing nanosize oxide or hydrated oxide particles is produced by precipitating at least one oxide or hydrated oxide from a solution or a sol which contains at least one element which can be precipitated as oxide or hydrated oxide in the presence of at least one surface-blocking substance by changing the pH and/or by addition of water.

6. The process of claim 5, wherein the solution containing the element which can be precipitated as oxide or hydrated oxide is an aqueous solution and/or a solution in at least one organic solvent miscible with water.

7. The process of claim 6, wherein the element which can be precipitated as oxide or hydrated oxide is present as either (1) a hydrolyzable salt in the case of an aqueous solution or (2) as a hydrolyzable organometallic compound in the case of an organic solution.

8. The process of claim 7, wherein the hydrolyzable salt is a nitrate or a salt of a carboxylic acid.

9. The process of claim 5, wherein the pH required for precipitating the oxide or hydrated oxide is set with ammonia, organic amines and/or quaternary ammonium salts.

10. The process of claim 5, wherein the precipitation of the oxide or hydrated oxide is accomplished by either (a) adding at least one acidic or basic substance and/or water to the solution or the sol which contains the element or elements which can be precipitated as oxide or hydrated oxide and the surface-blocking substance or substances; or (b) adding the solution or the sol which contains the element or elements which can be precipitated as oxide or hydrated oxide to an aqueous solution, which h as a pH suitable for the precipitation and contains the surface-blocking substance or substances.

11. The process of claim 1, wherein the liquid which has no solvent capability or only a slight solvent capability for the particles is selected from the group consisting of water, alcohols, glycols, amines, aliphatic, cycloaliphatic, aromatic, unsubstituted or substituted hydrocarbons and mixtures thereof.

12. The process of claim 1, wherein the surface-blocking substance is selected from the group consisting of nonionic surfactants, cellulose derivatives, long-chain alcohols, carboxylic acids, amines, amino acids, β-dicarbonyl compounds, polyvinyl alcohols and mixtures thereof.

13. The process of claim 12, wherein the nonionic surfactants are selected from the group consisting of sorbitan esters of fatty acids, polyethylene oxide derivatives of sorbitan esters of fatty acids and fatty acid glycol esters.

14. The process of claim 1, further comprising removing the surface-blocking substance.

15. The process of claim 14, wherein removing the surface-blocking substance is accomplished by washing, chemical reaction and/or dialysis.

* * * * *